United States Patent [19]

Fink

[11] Patent Number: 4,999,002
[45] Date of Patent: Mar. 12, 1991

[54] HIGH SPEED CHUCK APPARATUS

[76] Inventor: Anton Fink, 149 Crescent Dr., Searington, N.Y. 10507

[21] Appl. No.: 567,944

[22] Filed: Aug. 15, 1990

[51] Int. Cl.⁵ .......................... B23B 13/02; F15B 13/04
[52] U.S. Cl. ...................................... 279/2 A; 92/106; 279/4
[58] Field of Search ................. 279/2 A, 4, 110, 46 R; 91/240, 420; 92/106

[56] References Cited

U.S. PATENT DOCUMENTS

| 3,926,446 | 12/1975 | Rohm ........................ 279/4 |
| 3,954,275 | 5/1976 | Pickles ...................... 91/420 |
| 4,214,766 | 7/1980 | Rall et al. ............... 279/46 R |
| 4,249,459 | 2/1981 | Pruden ..................... 92/106 |
| 4,349,207 | 9/1982 | Fink .......................... 279/4 |
| 4,447,180 | 5/1984 | Pesch ........................ 279/4 |
| 4,537,410 | 8/1985 | Hiestand .................. 279/4 |
| 4,558,876 | 12/1985 | Call et al. ............ 279/110 X |
| 4,676,516 | 6/1987 | Fink ..................... 279/4 X |

FOREIGN PATENT DOCUMENTS

| 2915854 | 10/1979 | Fed. Rep. of Germany .......... 279/4 |
| 1182887 | 6/1959 | France .................................. 279/4 |
| 5425 | 9/1986 | World Int. Prop. O. ............. 279/4 |

Primary Examiner—William Briggs
Attorney, Agent, or Firm—Anthony J. Casella; Gerald E. Hespos

[57] ABSTRACT

A chuck assembly for high speed operations is provided. The workpiece gripping and releasing functions of the chuck are carried out pneumatically by a nonrotating air tube assembly extending through a bore in a machine tool to which the rotating chuck is mounted. The chuck is mounted to a portion of a machine tool for rotation therewith and is rotatably disposed over an air journal rigidly mounted to the nonrotating air tube assembly. Selective direction of compressed air causes relative movement between a piston mounted in a cylindrical work chamber of a chuck body. Relative movement between the piston and chuck body causes movement of an actuator having a wedge which is engages a generally annular clamping assembly.

12 Claims, 3 Drawing Sheets

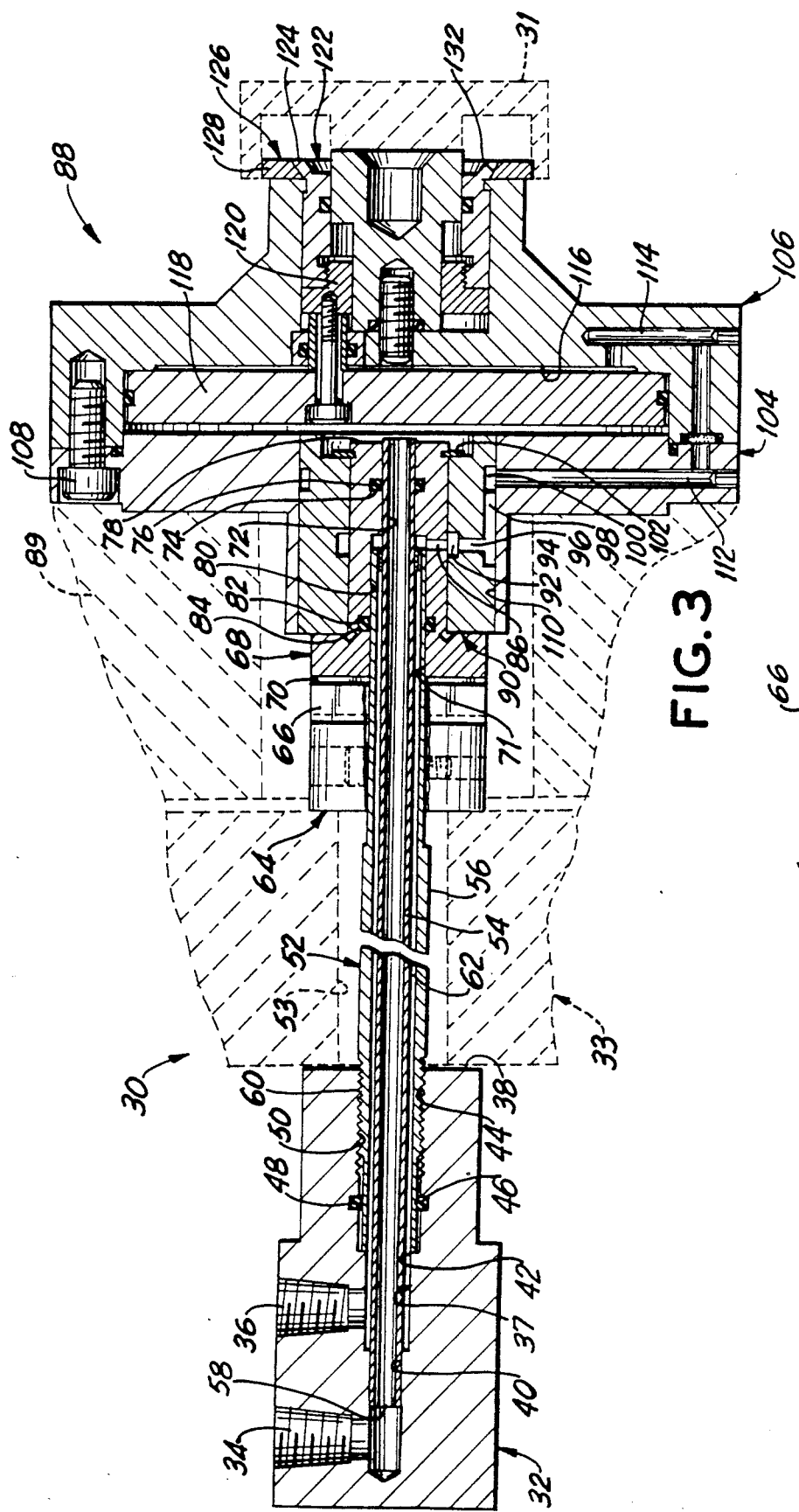
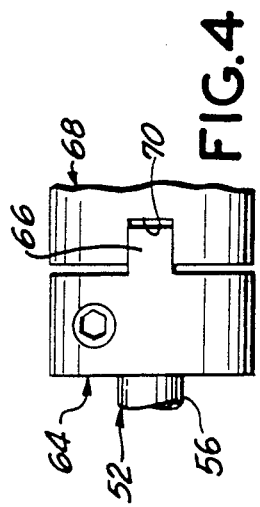
FIG.3
FIG.4

HIGH SPEED CHUCK APPARATUS

BACKGROUND OF THE INVENTION

Machine tools comprise a rotatable member to which a chuck assembly may be mounted. The chuck assembly is operative to engage a workpiece on which various machining operations may be carried out. With reference to FIG. 1, the typical prior art chuck assembly 10 for these purposes comprises a body 12 with an axially aligned cylindrical cavity (not shown) having a piston slidably mounted therein. Pneumatic pressure is selectively applied to one side or the other of the piston to generate relative axial movement between the piston and the body 12. The prior art chuck assembly 10 further includes three radially aligned channels 14 in which master jaws 16 are slidably disposed. The channels 14 may be disposed in either the body 12 or a member connected to the piston. A radially outer or radially inner surface of each master jaw typically is angularly aligned to the rotational axis of the chuck assembly 10 to define a wedge surface. The prior art chuck assembly 10 further includes an actuator (not shown) that may be rigidly mounted to the body or the piston. The actuator includes inclined wedge surfaces that are slidably engaged with the corresponding wedge surfaces on the respective master jaws 16. With this construction, relative axial movement between the piston and the body will cause a corresponding axial movement between the actuator and the master jaws 16. However, the cooperating wedge surfaces of the master jaws 16 and the actuator will convert this axial movement into a radially directed slidable movement of the master jaws 16 in the respective channels 14. Gripping jaws are rigidly but removably mountable to the master jaws 16 and undergo radial movement with the master jaws 16. In the typical prior art chuck assembly 10, the actuator will move in one axial direction to urge the jaws 16 inwardly for securely gripping the workpiece or in an opposed axial direction to move the jaws 16 outwardly to release the workpiece.

The prior art chuck assembly 10 must also be rotatable to enable the machine tool to perform an appropriate machining operation on the workpiece gripped by the chuck. The rotation of the chuck, however, must not interfere with the pneumatic pressure that is selectively applied to one side or the other of the piston for gripping the workpiece. To achieve these necessary rotation and gripping functions, the prior art chuck body 12 typically is mounted to a rotatable portion of the machine tool having a bore extending axially therethrough. A rotatable air tube assembly 18 passes through the axial bore of the machine tool and is rigidly connected to the chuck body 12 for rotation therewith. The air tube assembly 18 is comprised of a plurality of generally concentric tubes for selectively delivering compressed air to one side or the other of the piston in the chuck body 12. In particular, a central portion of the air tube assembly may selectively deliver compressed air to a forward side of the piston, while the annular space around the center tube will be employed to deliver compressed air to the rearward side of the piston. The air tube assembly 18 typically will extend between 18.0 inches and 48.0 inches depending upon the geometry of the machine to which the chuck assembly 10 is mounted. The prior art air tube assembly 18 extends from the rear side of the bore of the machine tool and is mounted to an air rotary journal 20 for selectively delivering the compressed air to one side or the other of the piston. The air journal 20 will remain stationary while the chuck body 12 and the air tube assembly 18 rotate under the action of the machine tool to which they are mounted.

The typical prior art chuck 10 shown in FIG. 1 may perform well at rotational speeds of up to approximately 4,000 rpm. At higher rotational speeds, the centrifugal forces exerted on the jaws often will overcome the pneumatic forces exerted on the piston and will force the jaws outwardly to thereby loosen the grip on the workpiece. Many prior art chucks have attempted to employ complex assemblies of counterweights which are intended to offset the effects of centrifugal force in an effort to retain the inward gripping power of the jaws at higher rotational speeds. However, chucks of this type are very complex and expensive and do not always work well.

U.S. Pat. No. 4,676,516 issued to the inventor herein on June 30, 1987 and shows a chuck that is of fairly simple construction but performs well at relatively high rotational speeds. In particular, the chuck shown in U.S. Pat. No. 4,676,516 includes an actuator ring disposed concentrically about the chuck body and the jaws. The actuator ring helps to hold the jaws at radially fixed positions in response to centrifugal forces exerted thereon. Additionally, certain embodiments of the chuck shown in U.S. Pat. No. 4,676,516 include a very simple counterweight for urging the piston or the chuck body in a direction for gripping the workpiece. As rotational speeds increase, the forces exerted by the counterweight act on the chuck to at least partly offset the effects of centrifugal force. The disclosure of U.S. Pat. No. 4,676,516 is incorporated herein by reference.

Several machining operations now require even higher rotational speeds. For example, metallic discs having axially aligned cavities on one side are employed in video cassette recorders to read the magnetically encoded signals on the video cassette tape. The discs must be manufactured with extreme precision both as to smoothness and concentricity. The need for precision and the competing need for manufacturing efficiency requires machine tools that operate at very high rotational speeds. Machine tool rotational speeds of 8,000 rpm often are required, and speeds in the range of 10,000 rpm – 12,000 rpm are considered to be more desirable. A control factor in these prior art machining operations has been the ability of prior art chuck assemblies to accurately retain the workpieces at these high rotational speeds. Although the chuck shown in U.S. Pat. No. 4,676,516 has proved to be effective at rotational speeds approaching those specified above, it has now been found that significant machining inaccuracies are attributable to the rotatable air tube assembly. More particularly, small dimensional inaccuracies are inevitable in the long thin-walled tubes. Even a carefully manufactured tube is likely to acquire a nonconcentric configuration somewhere along its length either during storage, installation or use. Even small eccentricities in any one of the purportedly concentric tubes will cause significant vibrations in the prior art chuck assembly as the high rotational speeds are approached. The probability of an eccentricity and the vibration causing effect of the eccentricity increases as the length of the air tube assembly increases. These vibrations more than offset the precision and efficiencies that can be obtained by machining at higher rotational speeds.

A chuck assembly that is very effective at lower rotational speeds is shown in U.S. Pat. No. 4,349,207 which issued to the inventor herein on Sep. 14, 1982. The chuck shown in U.S. Pat. No. 4,349,207 avoids air tube assemblies entirely and selectively applies the pneumatic fluid to one side or the other of the piston from a location adjacent the front working end of the chuck, and forward of the machine tool to which the chuck is mounted. The disposition of air supply means at a radially outward position in close proximity to the rotating gripping components of the chuck create eccentricities and unequal forces that prevent the chuck of U.S. Pat. No. 4,349,207 from operating at very high rotational speeds. These limitations do not present problems at lower rotational speeds for which the chuck of U.S. Pat. No. 4,349,207 is extremely effective.

The prior art also includes collet type chucks where a generally frustum-shaped gripping head is defined by an alternating array of metallic gripping jaws and elastomeric members arranged around the circumference of the frustum-shaped clamping head. Gripping occurs by urging the jaws inwardly from their unbiased position. The provision of the elastomeric members facilitates the release of the collet for removing a workpiece therefrom. The collet shown in U.S. Pat. No. 4,214,766 is not intended for the high rotational speeds referred to above, and the provision of the elastomeric material therein does not overcome the effects of centrifugal force. Furthermore, the collet shown in U.S. Pat. No. 4,214,766 does not employ the prior art air tube assembly as depicted in FIG. 1 above.

In view of the above, it is an object of the subject invention to provide a chuck apparatus capable of maintaining consistent gripping forces at very high rotational speeds.

It is another object of the subject invention to provide a chuck apparatus that avoids excessive vibrations at high rotational speeds.

An additional object of the subject invention is to provide a high speed chuck apparatus that is substantially immune to eccentricities in elongated air tube assemblies.

Still another object of the subject invention is to provide a chuck that enhances the uniform gripping forces on certain workpieces at higher rotational speeds.

SUMMARY OF THE INVENTION

The subject invention is directed to a chuck apparatus of the type employing an elongated air tube assembly extending through the bore of a rotatable machine tool for delivering a plurality of supplies of pneumatic pressure to the chuck apparatus. The air tube assembly for the subject chuck apparatus extends nonrotatably from a distributor housing disposed at or adjacent the rear side of the machine to a journal at or adjacent the front side of the machine. The journal is rigidly and nonrotatably mounted to the nonrotating air tube assembly and functions as a manifold for selectively delivering compressed air to appropriate locations in the chuck apparatus as explained further herein.

A chuck body is rotatably mounted about the journal for rapid rotation under the power provided by the machine tool. The interface between the chuck body and the journal defines an air gap substantially free of complex bushings and seals used in many prior art chucks and relying substantially entirely upon a closely machined interface between the chuck body and the journal. The pneumatic system employed with the chuck apparatus controls the pneumatic pressure within limits that are compatible with the air journal sealing system.

The chuck apparatus further comprises a generally disc-like piston slidably movable in axial directions within a cylindrical cavity of the chuck body in response to the selective application of pneumatic pressure to one side or the other of the piston.

The chuck apparatus further comprises an actuator rigidly connected to either the piston or the chuck body for relative axial movement. For example, the piston may be rigidly connected to an actuator such that the actuator moves in axial directions with the piston and relative to the chuck body. The actuator includes a wedge means for cooperating with a jaw assembly. More particularly, the wedge means of the actuator may define a ramped wedging surface angularly aligned to the rotational axis of the chuck apparatus. The jaw assembly includes a correspondingly aligned surface for engaging the wedge means of the actuator. Thus, ramping or wedging forces are exerted by the actuator on the jaw assembly in response to the axial movement of the actuator and piston relative to the chuck body. In other embodiments, the actuator means may be rigidly mounted to the chuck body to move with the chuck body and relative to the piston.

The actuator and jaw assembly may be similar to those disclosed in the above referenced U.S. Pat. No. 4,676,516. Alternatively, the jaw assembly may comprise a plurality of metallic jaw members disposed in alternating relationship to elastomeric connecting members about the circumference of the jaw assembly. The assembly of metallic jaws and elastomeric connecting segments therebetween is constructed to be elastomerically urged outwardly in response to the wedging forces generated by the actuator, and to resiliently move inwardly in response to a release of those wedging forces by the actuator. With this embodiment, the jaw assembly may be operative to perform an inside-to-outside gripping of a workpiece, and to subsequently move inwardly for release of the workpiece. This embodiment is especially preferred for the precise high speed machining of the outer surfaces of the metallic heads on video cassette recorders. As the machine tool apparatus advances the chuck assembly to very high rotational speeds, centrifugal forces will urge the metallic and elastomeric components of the jaw assembly radially outwardly to enhance the gripping power. Thus, in contrast to many prior art systems where high rotational speeds tended to loosen the gripping power of the jaws of a chuck, the subject chuck is able to achieve enhanced gripping power at higher rotational speeds.

As noted above, the typical prior art chuck comprises three radially aligned and equally spaced jaw members for gripping a workpiece. The subject chuck apparatus, however, may include more than three jaws, and in some embodiments a total of twelve jaws separated from one another by twelve elastomeric connecting members. The substantially larger number of jaws provided by the chuck apparatus of the subject invention results in a greater distribution of the centrifugal forces on the workpiece. Thus, the centrifugal forces that are relied upon in part to grip the workpiece are carefully distributed about the workpiece to prevent excessive centrifugal force in any one location from deforming the workpiece.

The chuck assembly of the subject invention may further include an end stop concentrically disposed with respect to the working end of the chuck for positioning the workpiece. For example, the end stop may be disposed centrally within the actuator to enable accurate positioning of the workpiece over the forward face of the chuck. The end stop preferably is removable and/or adjustable to accommodate different workpieces with a single chuck apparatus.

The chuck apparatus of the subject invention performs exceptionally well at very high rotational speeds for several reasons. In particular, the non-rotating air tube assembly entirely avoids the possibility of eccentricities along the length of the air tube assembly contributing to vibrations in the chuck apparatus. Any eccentricities that may occur become entirely irrelevant to the operation of the chuck apparatus. The chuck apparatus of the subject invention further reduces the effects of centrifugal force by employing an outwardly disposed actuator ring or an outward gripping force on the workpiece. This unique combination of a nonrotating air tube assembly and gripping means that are not affected by centrifugal force enables accurate chucking at high speeds that were not attainable with prior art systems and that therefore enable much more efficient and effective machining operations to be carried out with extremely high precision.

BRIEF DESCRIPTION OF THE DRAWINGS

FIG. 3 is a cross-sectional view taken along line 3—3 in FIG. 2.

FIG. 4 is a top elevational view of a clamp at the interface of the air tube assembly and journal of the subject chuck apparatus.

DETAILED DESCRIPTION OF THE PREFERRED EMBODIMENT

Figure 1:
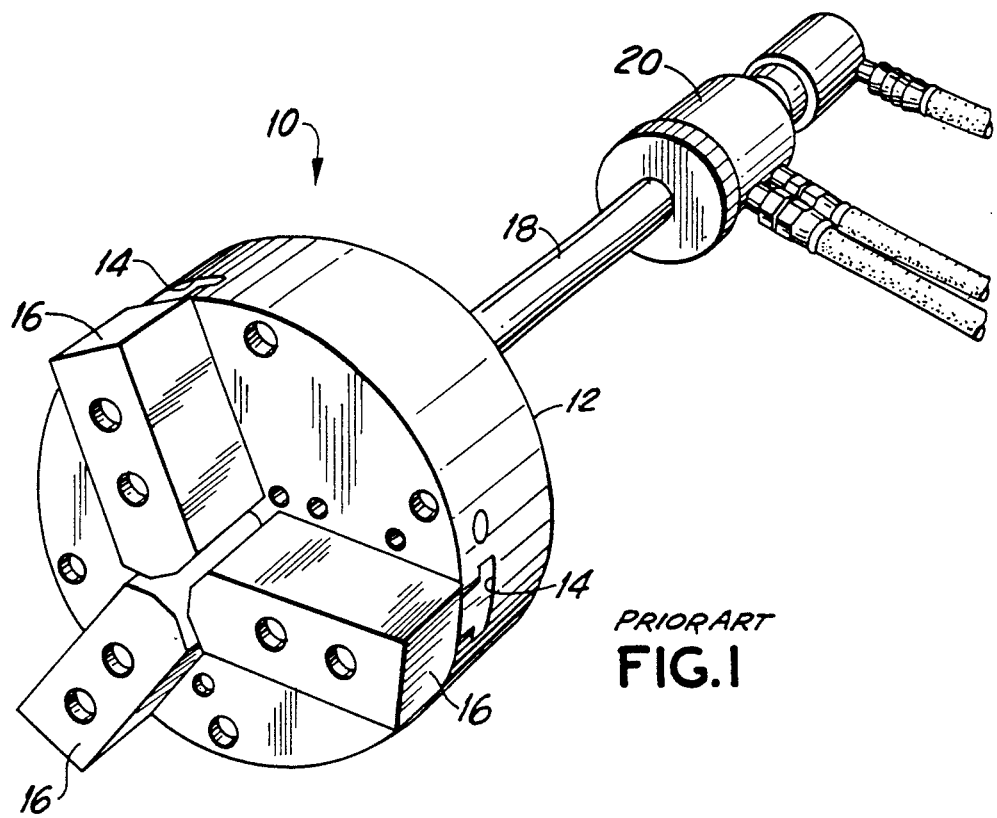
FIG. 1 is a perspective view of a prior art chuck.
Figure 2:
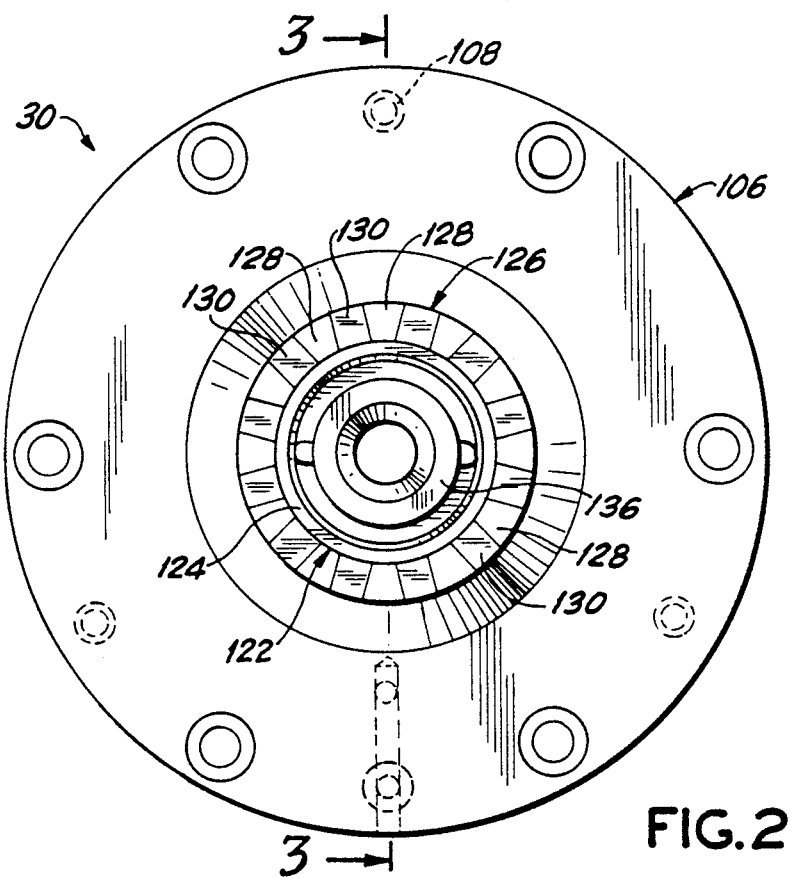
FIG. 2 is a front elevational view of a chuck in accordance with the subject invention.

The chuck apparatus of the subject invention is identified generally by the numeral 30 in FIGS. 2-4. The chuck apparatus 30 is pneumatically operated for selectively gripping a workpiece 31 or selectively releasing a workpiece 31 to be machined. The compressed air for applying the pneumatic pressure to the chuck apparatus 30 is delivered to a distributor 32 which defines a machined metallic member of generally cylindrical configuration. The distributor 32 is nonrotatably mounted to the rear end of a machine tool 33 having a head that is rotatable at high speeds. The distributor 32 includes first and second pneumatic inlets 34 and 36 which are selectively engageable with air hoses (not shown) which lead to a control valve and subsequently onto a pneumatic supply system comprising air filters, regulators, lubricators and pressure gauges as well as a supply of compressed air. The system connectable to the inlets 34 and 36 is operative to deliver air at substantially 80 p.s.i. The distributor 32 further includes a stepped axial bore 37 extending into the front end 38 thereof. More particularly, the axial bore 37 defines a minor diameter portion 40 extending into communication with the first pneumatic inlet 34. An intermediate diameter portion 42 is disposed forwardly of the minor diameter portion 40 and communicates with the second pneumatic inlet 36. A major diameter portion 44 is adjacent the forward end 38 of the distributor 32 and is characterized by an annular groove 46 in which an elastomeric 0-ring seal 48 is disposed. The major diameter portion 44 of the axially aligned bore 37 in the distributor 32 is characterized by an array of threads 50 formed therein.

The chuck apparatus 30 further includes an air tube assembly 52 which is nonrotatably mounted to the distributor 32 and extends forwardly therefrom through the bore 53 of the machine tool 33. The length of the air tube 52 will vary from one machine tool to the next depending upon the dimensions of the particular machine tool. Typical air tube assemblies will extend between approximately 18.0 inches and approximately 48.0 inches. The air tube assembly 52 comprises generally concentric inner and outer pipes 54 and 56 respectively. The inner pipe is dimensioned to be received within the minor diameter portion 40 of the axial bore 37 in the distributor 32, such that the central aperture 58 of the inner pipe 54 communicates directly with the first pneumatic inlet 34. The inner pipe 54 further extends a greater distance forwardly than the outer pipe 56 as explained further herein. The outer pipe 56 is dimensioned to be disposed in the major diameter portion 44 of the axial bore 37 in the distributor 32 and includes an array of threads 60 for engaging the threads 50 of the distributor 32. The inner diameter of the outer pipe 56 is such that an annular space 62 exists between the inner and outer pipes 54 and 56. These radial dimensions and relative axial positions of the inner and outer pipes 54 and 56 are such that the annular space 62 between the inner and outer pipes 54 and 56 communicates with the pneumatic inlet 36 of the distributor 32, but does not communicate with the pneumatic inlet 34 of the distributor 32. It will also be appreciated that the threaded engagement of the nonrotating air tube assembly 52 to the distributor 32 enables intentional separation, but precludes separation during normal use of the chuck assembly 30. Thus, the air tube assembly 52 is nonrotatable within the bore 53 of the machine tool 33, and any eccentricities that may exist will not affect the operation of the machine tool 33 or the chuck assembly 30.

A clamp 64 is securely connected to the outer tube 56 of the air tube assembly 52 at a location thereon substantially remote from the distributor 32 and in proximity to the front working end of the machine tool 33 with which the chuck assembly 30 is employed. The clamp 64 includes a noncircular projection 66 extending forwardly therefrom.

The chuck assembly 30 further includes an air journal 68 having a noncircular notch 70 at the rear end thereof for engaging the projection 66 of the clamp 64 as illustrated most clearly in FIG. 4. Thus, the air journal 68 will remain nonrotational relative to the clamp 64, which in turn is nonrotatably mounted to the air tube assembly 52.

The air journal 68 includes a stepped axially aligned bore 71 extending therethrough including a forward minor diameter portion 72 defining an internal diameter substantially equal to the outer diameter of the inner air tube 54. The minor diameter portion 72 of the axial bore 71 in the air journal 68 is further characterized by an annular groove 74 in which an elastomeric O-ring 76 is disposed. The inner air tube 54 is mounted in the minor diameter portion 72 of the axial bore 71 in the air journal 68 to be engaged by the 0-ring 76 and to extend substantially entirely to the extreme forward end 78 of the air journal 68. The axial bore 71 through the air journal 68 is further characterized by a major diameter portion 80 defining an inner diameter substantially equal to the outer diameter of the outer air tube 56. The major diameter portion 80 also is characterized by an annular groove 82 in which an elastomeric O-ring 84 is disposed. The outer tube 56 is disposed within the major diameter portion 80 of the axial bore 71 through the air journal 68 such that the outer tube 56 is sealingly engaged by the 0-ring 84. The extreme forward end of the outer air tube 56 terminates rearwardly of the step between the minor and major diameter portions 72 and 80 of the axial bore 71 in the air journal 68 to permit communication between the annular space 62 of the air tube assembly 52 and the extreme forward end of the major diameter portion 80 of the axial bore 71 through the air journal 68. The air journal 68 is further characterized by a generally radially aligned aperture 86 extending therethrough from the major diameter portion 80 of the axial bore 71.

All portions of the chuck assembly 30 described above are nonrotatable relative to the machine tool 33 with which the chuck assembly 30 is employed. Thus, any eccentricities or nonsymmetry that may exist will have no effect on the precise performance of the machine tool 33 or the ability of the chuck assembly 30 to grip a workpiece at even very high rotational speeds.

The embodiment of the chuck assembly 30 depicted in FIGS. 2-4 further includes a chuck head identified generally by the numeral 88 which is securely mounted to the rotating portion 89 of the machine tool 33 for rotation therewith. The chuck head 88 includes a generally cylindrical bearing 90 having a central through aperture 92 into which the air journal 68 is mounted. The central through aperture 92 in the bearing 90 and the outer surface of the air journal 60 are precisely manufactured to provide a close interfit therebetween but to permit free relative rotation therebetween. A close radial clearance permits the free rotation essential for operation of the chuck and the machine tool and further substantially prevents escape of significant portions of the air applied through the air tube assembly 52.

The bearing 90 includes an inner annular groove 94 formed on the inner surface 92 thereof at an axial location aligned with the aperture 86 of the air journal 68. The bearing 90 further includes a radially aligned aperture 96 extending outwardly from the inner annular groove 94. An axial groove 98 is defined on the outer surface of the bearing 90, and extends forwardly from the radial aperture 96 to an outer annular groove 100. This arrangement of apertures and grooves permits direct communication of air from the pneumatic inlet 36 through the air tube assembly 52 and through both the air journal 68 and the bearing 90 to the outer annular groove 100 of the bearing 90. It will be noted that this communication of air is enabled for all rotational alignments of the bearing 90 relative to the stationary air journal 68. The relative axial dispositions of the air journal 68 and bearing 90 to achieve this continuous communication is ensured by a locking member 102 lockingly engaged in a groove at the forward end 78 of the air journal 68 and abutting a forward surface of the bearing 90.

The chuck head 88 further includes a rear cover 104 and a chuck body 106 which are lockingly retained to one another in sealed engagement by bolts 108. The rear cover 104 includes an axial aperture 110 extending therethrough and surrounding the bearing 90. Additionally, the rear cover includes a pneumatic channel 112 which provides communication between the outer annular groove 100 of the bearing 90 to a forward location on the cover 104.

The chuck body 106 similarly includes a pneumatic channel 114 disposed to communicate directly with the pneumatic channel 112 of the rear cover 104, and to communicate with a forward location of a cylindrical working space 116 defined between the rear cover 104 and the chuck body 106.

A disc-like piston 118 is disposed within the cylindrical working space 116 for axial movement therein. More particularly, a forward axial movement of the piston 118 within the cylindrical working space 116 is achieved by evacuating air from the pneumatic inlet 36 and simultaneously directing compressed air through the pneumatic inlet 34. The air directed into the pneumatic inlet 34 travels entirely through the center aperture 58 of the inner tube 54 and into a portion of the cylindrical working space 116 rearwardly of the piston 118. This air pressure urges the piston 118 forwardly in the cylindrical working space 116. Conversely, the piston 118 is moved rearwardly in the cylindrical working space 116 by evacuating air from the pneumatic air inlet 34 and simultaneously directing air into the pneumatic inlet 36. Air directed into the pneumatic inlet 36 passes through the annular space 62 through the above described array of apertures and channels in the journal 68, the bearing 90, the rear cover 104 and the chuck body 106. This air is directed through the pneumatic channel 114 and into the side of the cylindrical work space 116 forwardly of the piston 118 for urging the piston rearwardly.

The piston 118 is securely connected to an actuator plate 120 which in turn is securely connected to an actuator 122. Thus, the actuator plate 120 and the actuator 122 will move forwardly or rearwardly with the piston 118 and relative to the chuck body 106. The extreme forward end of the actuator 122 defines a continuous frustum-shaped outwardly extending wedge 124.

The chuck 88 further includes a generally annular clamping assembly identified generally by the numeral 126. The clamping assembly 126 is defined by twelve equally spaced metallic gripping members 128 disposed alternatively with an equal number of elastomeric connecting members 130, as illustrated most clearly in FIG. 2. The inner portions of the generally annular gripping assembly 126 defined by the metallic members 128 is of a generally frustum configuration conforming to and engaged over the wedge portion 124 of the actuator 122. More particularly, each metallic member includes a radially inner surface 132 which is aligned at an angle to the rotational axis of the chuck head 88 for sliding engagement with the forward wedge 124 of the actuator 122. With this arrangement, a rearward movement of the actuator 122 will cause the wedge 124 thereof to slide against the inner ramped surface 132 of the metallic jaws 128 of the clamping assembly 126 to urge the jaws 28 outwardly. Conversely, forward movement of the actuator 122 will reduce the wedging forces on the annular clamping assembly 126 enabling the elastomeric portions 130 thereof to urge the metallic jaws 126 inwardly for continued face-to-face contact with the wedge 124 of the actuator 122. The radially outer surfaces of the metallic jaws 128 define gripping surfaces for gripping an interior surface of a workpiece 31.

The chuck head 88 further includes an end stop 136 disposed axially within the actuator 22. The end stop 136 functions to ensure accurate positioning of a workpiece 31 on the chuck 30. Thus, the particular configuration illustrated herein is only one of many optional configurations for such an end stop 136, with the selected configuration depending entirely upon the shape and dimension of the workpiece 31.

In use, the annular clamping assembly 126 is collapsed radially inwardly to permit mounting of a workpiece 31 thereon. This inward collapsing is achieved by evacuating compressed air from the pneumatic inlet 36 and simultaneously directing compressed air into the pneumatic inlet 34. These relative flows of compressed air will cause the piston 118 to slide forwardly within the cylindrical working chamber 116 defined by the rear cover 104 and the chuck body 106. Forward movement of the piston 118 relative to the chuck body 106 will cause the actuator plate 120 and the actuator 102 to advance forwardly relative to the chuck body 106 and will enable the annular clamping assembly 126 to collapse radially inwardly under the action of the elastomeric connecting members 130. In particular, the elastomeric connecting members 130 disposed intermediate the metallic jaws 128 of the clamping assembly 126 will cause the inclined surfaces 132 of the jaws 128 to slide along the outer wedge surface 124 of the actuator 122. The workpiece 31 may then be mounted over the annular clamping assembly 126 with the position thereof being positively assured by the end stop 136.

The workpiece 31 may then be gripped by evacuating compressed air from the pneumatic inlet 34 and simultaneously directing compressed air into the pneumatic inlet 36. This relative flow of compressed air will cause the piston 118 to move rearwardly in the cylindrical working chamber 116 defined by the rear cover 104 and the chuck body 106. The rearward movement of the piston 118 will also pull the actuator plate 120 and the actuator 122 rearwardly. Forces generated by the frustum-shaped wedge 124 against the inclined inner surfaces 132 of the jaws 128 in the annular clamping assembly 126 will cause the annular clamping assembly 126 to expand radially outwardly. In particular, the wedging forces generated by the rearward movement of the actuator 122 will overcome the resilient forces exerted by the elastomeric connecting member 130 intermediate the respective jaws 128.

The chuck head 88 then can be rotated under the power of the machine tool 33 to which it is mounted. This rotation of the chuck head 88 is independent of the air tube assembly 52 extending nonrotatably through the bore 53 of the machine tool 33. More particularly, the relative rotation occurs between the bearing 90 of the chuck 88 and the air journal 68. High speed relative rotation therebetween is enabled without complex sealing means in view of the close radial tolerance between the journal 68 and the bearing 90. As higher rotational speeds are achieved, centrifugal forces may urge the twelve jaws 128 into tighter clamping engagement with the workpiece 31. The centrifugal forces will not affect the simple operation of the chuck assembly 30 in other respects. In particular, any eccentricities in the air tube assembly 52 will not cause vibrations and will not be exacerbated by high rotational speeds in view of the nonrotating condition of the entire air tube assembly 52 and the associated air journal 68. Furthermore, forces exerted on the workpiece 31 in response to both the wedging action of the actuator and centrifugal forces will be uniformly distributed about the workpiece by virtue of the large number of metal jaws 128 and the elastomeric connecting members 130 extending continuously therebetween.

Figure 5:
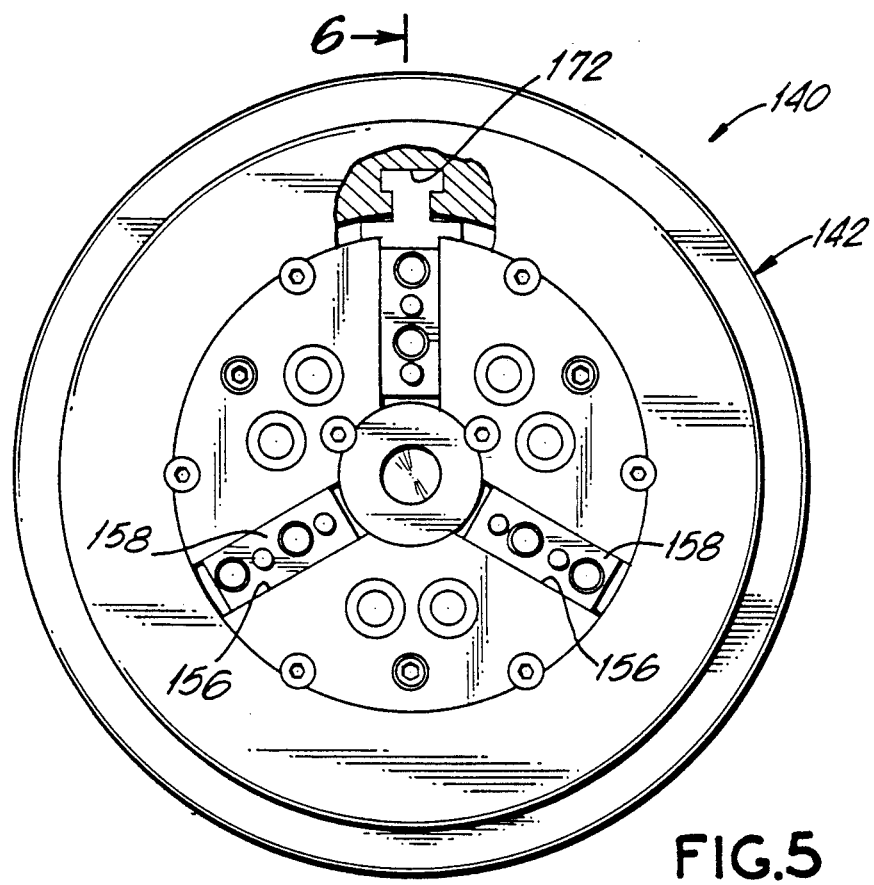
FIG. 5 is a front elevational view of an alternate chuck.
Figure 6:
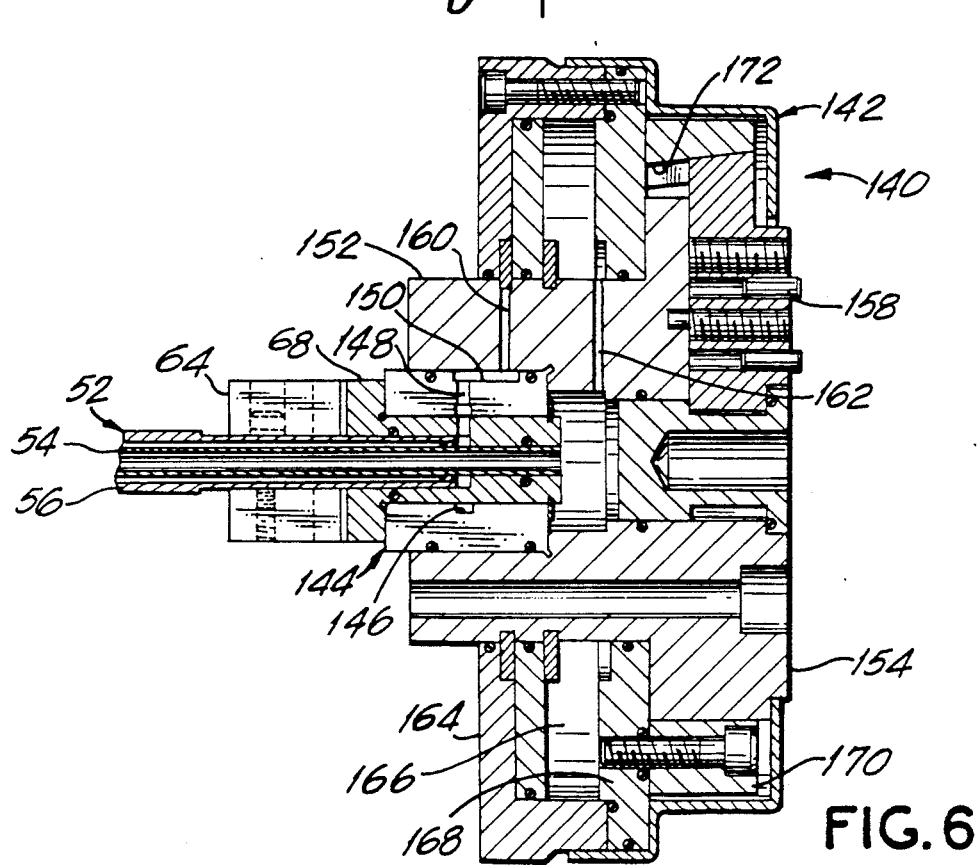
FIG. 6 is a cross-sectional view taken along lines 6—6 in FIG. 5.

An alternate chuck assembly is depicted in FIGS. 5 and 6, and is identified generally by the numeral 140. The chuck assembly 140 includes a distributor (not shown) identical to the distributor 32 depicted in FIG. 3. The chuck assembly 140 further includes an air tube assembly 52 which is identical to the air tube assembly of the same numerical identification depicted in FIG. 3 above. The air tube assembly 52 of the chuck assembly 140 is non-rotatable and extends through a non-rotatable clamp 64 and into a non-rotatable air journal 68 both of which are identical to the parts identified by the same numerals in FIGS. 3 and 4. As in the previously described embodiment, the air tube assembly 52 extends non-rotatably through the bore of a machine tool for delivering plural supplies of air from the distributor on the rear side of the machine tool to gripping portions of the chuck assembly 140 on the front and rotatable side of the machine tool. As in the previous embodiment, the air tube assembly 52 includes an inner pipe 54 and an outer pipe 56 with an annular space therebetween. A first supply of air may be delivered centrally through the inner pipe 54, while a second supply of air may be delivered separately through the annular space between the inner and outer pipes 54 and 56.

The chuck assembly 140 depicted in FIGS. 5 and 6 includes a chuck head which is identified generally by the numeral 142 and which is securely mounted to the rotating portion of the machine tool, in the manner depicted with respect to the previously described embodiment. The chuck head 142 includes a generally cylindrical bearing 144 which is rotatably mounted about the air journal 68, as shown most clearly in FIG. 6. The bearing 144 functions identically to the bearing 90 described above, but is structurally somewhat different in view of the different configurations of the chuck heads 88 and 142, in these two embodiments. More particularly, the bearing 144 includes an annular groove 146 on an inner annular surface thereof and at an axial location aligned with the aperture 86 in the air journal 68. A radially aligned aperture 148 extends from the annular groove 146 outwardly through the bearing 144 and communicates with an axially aligned groove 150 in the outer cylindrical surface of the bearing 144. Thus, air travelling through the annular space between the inner and outer tubes 54 and 56 of the air tube assembly 52 may pass through the air journal 68 and through the array of apertures and grooves defined in the bearing 144. As in the previous embodiment, air directed through the inner tube 54 will flow entirely through the axial end of the air journal 68.

The chuck head 142 further includes a generally cylindrical body 152 which is non-rotatably mounted around the bearing 144. The forward end 154 of the body 152 is characterized by an array of radially aligned slots 156 for engaging master jaws 158 which perform the gripping function of the chuck head 142.

The chuck body 152 is provided with a plurality of spaced apart generally radially aligned apertures 160 and 162 extending therethrough. The aperture 160 is more rearwardly disposed on the chuck body 152 and is aligned with the forward end of the axial channel 150 in the outer surface of the bearing 144. Thus, the aperture 160 will deliver air pressure from the annular gap between the inner and outer tubes 54 and 56 through the chuck body 152. The aperture 162 is more forwardly disposed on the chuck body 152 and will deliver a supply of air from the inner tube 54.

The chuck head assembly 142 further includes a generally annular cylinder 164 mounted around the chuck body 162. The mounting of the cylinder 164 to the chuck body 152 permits relative axial sliding movement therebetween but prevents relative rotation. The cylinder 164 defines a generally annular working cavity 166 surrounding portions of the chuck body 152. A cover 168 is bolted to the cylinder 164 and also is mounted around the chuck body 152 for sliding axial movement therealong.

An actuator ring 170 is rigidly and non-rotatably mounted to the cover 168 for axial movement therewith. The actuator ring 170 includes a plurality of generally T-shaped slots 172 which are shown most clearly in FIG. 5. Each T-shaped slot 172 of the actuator 170 engages a comparably configured outermost portion of a master jaw 158. Additionally, each T-shaped slot 172 includes a radially outwardly disposed wedge surface which is engaged at an angle to the rotational axis of the chuck assembly 140. The wedging interaction generated between the actuator ring 170 and the respective master jaws 158 by the axial movement of the actuator ring 170 will cause the master jaws 158 to move either radially inwardly or radially outwardly within the respective channels 156 of the chuck body 152.

Axial movement of the cylinder 164, the cover 168 and the actuator ring 170 relative to the chuck body 152 is effected by means of a generally annular piston 172. More particularly, the piston 172 is non-movably mounted around the chuck body 152 and within the working cavity 166 of the cylinder 164. The relative movement is achieved by selectively directing air under pressure to a portion of the cylindrical working cavity 166 on either side of the piston 172. The movement of air into the portion of the working cavity 166 forward of the piston 172 will urge the cylinder 164, the cover 168 and the actuator ring 170 forwardly relative to the piston 172 and the chuck body 152. The wedged alignment of the actuator ring 170 will thus urge the master jaws 158 radially inwardly. Conversely, evacuation of air from the portion of the working cavity 166 forward of the piston 172 and the simultaneous direction of air into the portion of the working cavity 166 rearward of the piston 72 will cause the cylinder 164, the cover 168 and the actuator 170 to move rearwardly relative to the piston 172 and the chuck body 152. The wedged configuration of the actuator ring 170 will thus cause the master jaws 158 to move radially outwardly. It will be appreciated that the chuck head assembly 142 depicted in FIGS. 5 and 6 is similar to the chuck assembly of the above referenced U.S. Pat. No. 4,676,516. As disclosed in U.S. Pat. No. 4,676,516, this construction is well suited to accurate gripping at high rotational speeds. The combination of this high speed chuck head assembly with the non-rotating air tube assembly and the non-rotating air journal disposed substantially at the forward face of the rotating machine tool eliminates a source of vibration and inaccuracy that could have occurred with this otherwise extremely precise high speed chuck assembly.

While the invention has been defined with respect to a preferred embodiment, it is apparent that various changes can be made without departing from the scope of the invention as defined by the appended claims. For example, in certain embodiments more complex air tube assemblies may be required, including concentric tubes for directing lubricant or coolant to selected areas of the chuck. In certain embodiments, the actuator may be fixedly mounted to the chuck body for movement relative to a piston. Certain embodiments may not require the end stop illustrated herein, while others will require end stops of various other configurations. Additionally, different numbers of metallic jaws and jaws of different configurations may be provided depending upon the requirements of a particular machining operation. These and other changes will be apparent to a person skilled in this art after having read the subject disclosure.

I claim:

1. A high speed chuck assembly for a machine tool having a rotatable portion for high speed rotation about an axis and having a bore extending therethrough generally along the axis of rotation, said chuck assembly comprising:
   an air tube assembly extending nonrotatably through the bore of the machine tool, said air tube assembly defining a plurality of concentric air passageways;
   means for selectively delivering air to the air passageways;
   an air journal nonrotatably mounted to an end of said air tube assembly and including a plurality of passageways extending therethrough and communicating respectively with the air passageways of the air tube assembly;
   a chuck rotatably mountable over and surrounding at least partially the air journal and mountable to the rotatable portion of the machine tool, the chuck including a body having a cylindrical working cavity therein concentric with the axis of rotation, a piston slidably movable in the cylindrical working cavity, passage means extending through the chuck for providing communication from the respective passageways of the air journal to alternate respective sides of the pistons such that selective application of air enables movement of the piston in the cylindrical working cavity;
   an actuator rigidly mounted to the piston for slidable movement therewith relative to the body, said actuator having a generally frustum-shaped wedge; and
   a clamping assembly in sliding engagement with the wedge of the actuator, the clamping assembly comprising an array of radially aligned jaws, such that movement of the actuator and piston in a first axial direction generates wedge forces against the clamping assembly for urging the clamping assembly in a first radial direction, and such that movement of the piston and actuator in a
   second axial direction enables the clamping assembly to move in an opposed radial direction.

2. A chuck assembly as in claim 1 wherein the wedge portion of the actuator flares radially outwardly at locations thereon remote from the piston, and wherein the clamping assembly comprises elastomeric connecting members extending between the jaws such that movement of the actuator in the first axial direction urges the clamping assembly radially outwardly, and such that movement of the actuator in the second axial direction enables radially inward collapsing of the actuator in response to resilient forces of the elastomeric connecting members.

3. A chuck assembly as in claim 2 wherein the clamping assembly comprises more than three jaws separated from one another respectively by elastomeric connecting members, such that centrifugal forces generated on the clamping assembly are distributed substantially uniformly thereabout.

4. A chuck assembly as in claim 3 wherein the clamping assembly comprises twelve jaws separated respectively from one another by elastomeric connecting members.

5. A chuck assembly as in claim 1 further comprising an end stop mounted in proximity to the actuator and the clamping assembly for accurately mounting a workpiece to the chuck assembly.

6. A chuck assembly as in claim 1 wherein air pressure of approximately 80 p.s.i. is selectively applied to said chuck assembly for moving the piston relative to the chuck body.

7. A chuck assembly for high speed rotation with a rotating portion of a machine tool, said machine tool comprising a bore extending therethrough and concentric with the axis of rotation, said chuck assembly comprising:

an air journal having first and second discrete passage means extending therethrough for receiving first and second supplies of air selectively applied thereto, said air journal being nonrotatably disposed generally centrally within the bore of the machine tool;

a generally cylindrical bearing rotatably mounted over the air journal, bearing channel means extending through the bearing and communicating with one of said passage means of said air journal;

a cover fixedly mounted to the bearing;

a body mounted to the cover and configured to define a generally cylindrical working cavity therebetween;

a piston mounted in the cylindrical working cavity of the body and axially movable therein;

first air passageway means extending through at least one of said cover and said body for selectively delivering air from the journal to a portion of the cylindrical working cavity on a first side of the piston;

second air passageway means for delivering air to a portion of the cylindrical working cavity on a second side of said piston means;

an actuator rigidly connectable with a selected one of said piston and said body, said actuator comprising an outwardly flared wedge; and a clamping assembly engaged over the outwardly flared wedge for slidable movement relative thereto, said clamping assembly being defined by a plurality of jaws and a corresponding plurality of elastomeric connecting members extending between and connecting the jaws, whereby movement of the actuator in a first axial direction generates forces on the wedge of the actuator for urging the jaws of the clamping assembly radially outwardly, and whereby resiliency of the elastomeric members urges the clamping member generally radially inwardly in response to movement of the actuator in a second axial direction.

8. A chuck assembly as in claim 7 further comprising an air tube assembly nonrotatably extending through the bore of the machine tool and communicating with the air journal, said air tube assembly comprising first and second concentric air passageways for communicating with the respective first and second discrete passage means of the air journal.

9. A chuck assembly as in claim 7 wherein air pressure of approximately 80 p.s.i. is selectively applied to said first and second discrete passage means of said air journal for moving the piston in the cylindrical working cavity.

10. A chuck assembly as in claim 7 wherein the clamping assembly comprises twelve jaws and twelve elastomeric connecting members defining an alternating annular array.

11. A chuck assembly as in claim 7 further comprising an end stop mounted in proximity to the actuator and the clamping assembly for accurately mounting a workpiece to the chuck assembly.

12. A chuck assembly for a machine tool, said machine tool defining a forward working end having a rotatable portion for rotation about an axis at speeds of at least 8,000 rpm, a bore extending through the machine tool generally along the rotational axis from the rotating portion of the machine tool to a rear end thereof, said chuck assembly comprising:

an air distributor nonrotatably mounted adjacent the rear end of the machine tool for receiving first and second supplies of air;

an air tube assembly nonrotatably connected to the distributor and nonrotatably extending through the bore of the machine tool from the rear end to a location in proximity to the forward end thereof, said air tube assembly comprising first and second air passageways for delivering the first and second supplies of air from the distributor;

an air journal nonrotatably mounted to the air tube assembly in proximity to the front end of the machine tool, said air journal comprising means for separately delivering air from the first and second air passageways of the air tube assembly;

a chuck head rigidly mounted to the rotatable portion of the machine tool and rotatably mounted over and at least partially surrounding the air journal, said chuck head defining a generally cylindrical working cavity therein, a piston being mounted in the cylindrical working cavity for axial movement therein, said chuck head comprising means for delivering air from the air passageways to alternate respective sides of the piston in the cylindrical working cavity;

an actuator mounted to the chuck head for axial movement in response to relative axial movement of the piston in the cylindrical working cavity, said actuator comprising a wedge angularly aligned to the rotational axis; and a clamping assembly slidably mounted to the wedge of the actuator and comprising an annular array of jaws such that movement of the actuator in a first axial direction radially expands the clamping assembly and such that movement of the actuator in a second axial direction radial contracts the clamping assembly, whereby the nonrotatable air tube assembly is substantially free of vibrations.

* * * * *